(12) United States Patent
Hattori

(10) Patent No.: US 7,477,578 B2
(45) Date of Patent: Jan. 13, 2009

(54) DISK RECORDING DEVICE AND DISK RECORDING METHOD FOR RECORDING AND ERASING TITLES ON A DISK

(75) Inventor: Hisahide Hattori, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 841 days.

(21) Appl. No.: 10/943,208

(22) Filed: Sep. 17, 2004

(65) Prior Publication Data

US 2006/0062121 A1  Mar. 23, 2006

(30) Foreign Application Priority Data

Oct. 29, 2003 (JP) ............................. 2003-369309

(51) Int. Cl.
*G06F 12/00* (2006.01)
(52) U.S. Cl. .................. 369/47.1; 360/55; 711/112; 711/170; 711/171; 711/172; 711/173
(58) Field of Classification Search .............. 369/47.1; 360/55; 711/112, 170–173
See application file for complete search history.

(56) References Cited

U.S. PATENT DOCUMENTS

| | | | | |
|---|---|---|---|---|
| 5,107,481 A | * | 4/1992 | Miki et al. | 369/53.21 |
| 5,737,639 A | * | 4/1998 | Ohmori | 710/73 |
| 5,949,955 A | * | 9/1999 | Nakai | 386/106 |
| 6,353,704 B1 | * | 3/2002 | Nakatani et al. | 386/126 |
| 6,449,423 B1 | * | 9/2002 | Takahashi et al. | 386/52 |
| 6,549,297 B1 | * | 4/2003 | Matsuo et al. | 358/1.17 |
| 7,266,067 B2 | * | 9/2007 | Hattori | 369/53.2 |
| 2001/0015944 A1 | | 8/2001 | Takahashi et al. | |
| 2005/0083805 A1 | * | 4/2005 | Hattori | 369/47.22 |

FOREIGN PATENT DOCUMENTS

| | | |
|---|---|---|
| EP | 0333165 A2 | 9/1989 |
| EP | 0333165 A3 | 9/1990 |
| EP | 0905699 A2 | 3/1999 |
| EP | 0905699 A3 | 7/1999 |
| JP | 7-175691 | 7/1995 |
| JP | 11-232792 | 8/1999 |
| JP | 2000-013728 | 1/2000 |
| JP | 2002-108661 | 4/2002 |

OTHER PUBLICATIONS

European Search Report dated Feb. 11, 2005 for Appln. No. 04 02 2329.

* cited by examiner

*Primary Examiner*—Hong Kim
(74) *Attorney, Agent, or Firm*—Pillsbury Winthrop Shaw Pittman, LLP

(57) ABSTRACT

Recording sections configured to record titles on a disk based on a management method in which additional recording and erasing of each title is possible, and each of the titles are recorded consecutively in a recording region, and the recorded each title is managed by a manager table which corresponds with the title candidate attached before the finalizing processing is carried out, the start position, and size, and in the case where a recorded title is erased, the region where erasure has been done becomes a recordable empty region and reference to the start position and size from the title candidate of the erased title becomes impossible on the manager table, and a first control section configured to designate the appropriate empty region for recording the title for which reserve recording is requested, from the empty regions present on the disk when the reserve recording of the title on the disk has been requested.

6 Claims, 7 Drawing Sheets

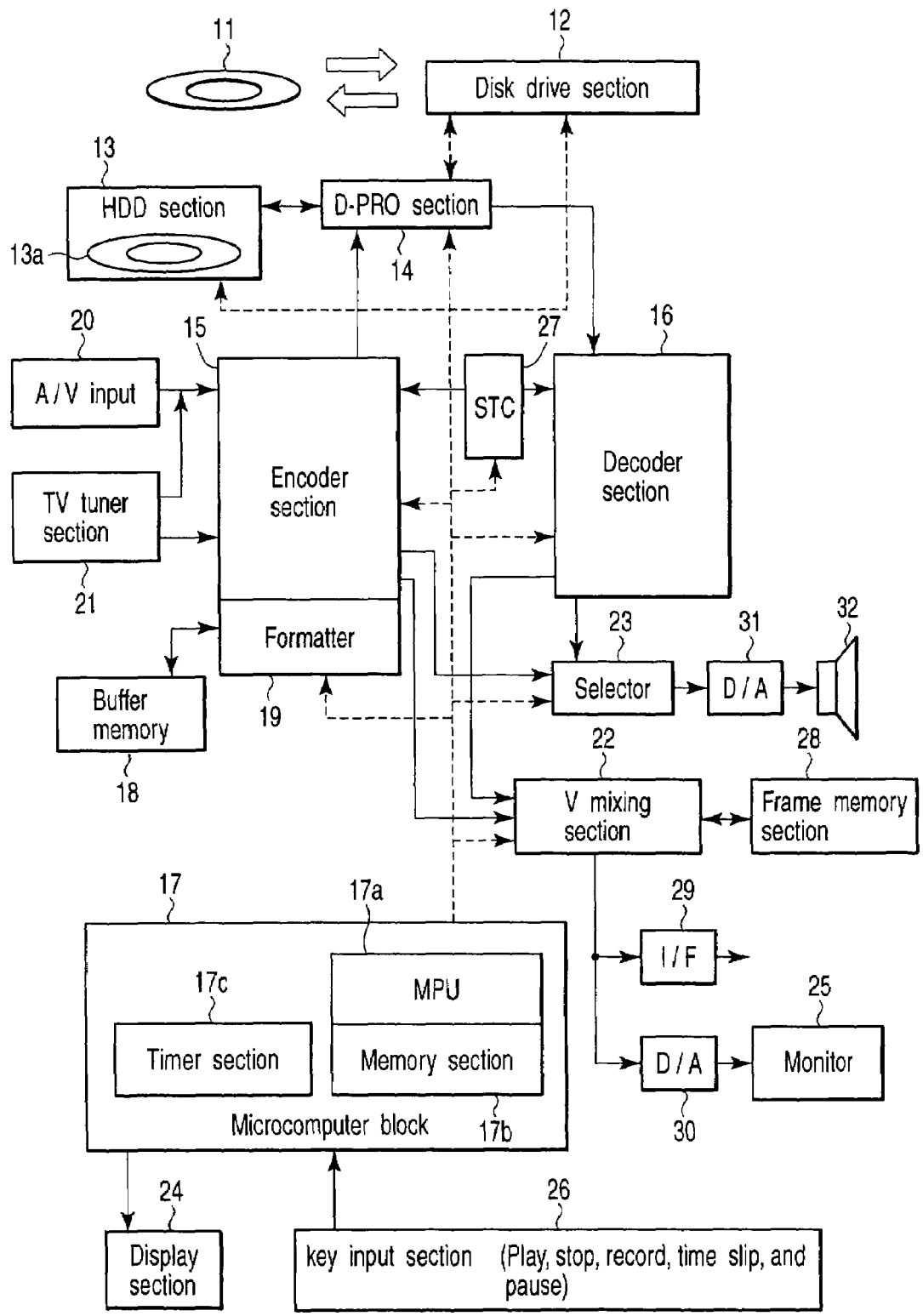
F I G. 1

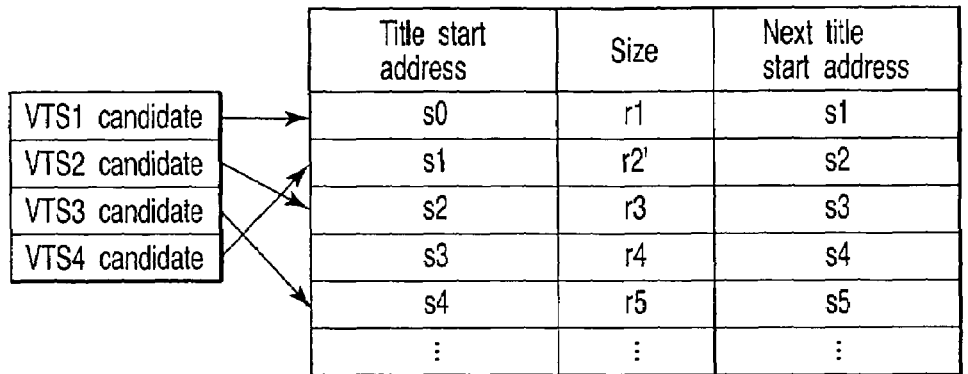
FIG. 9
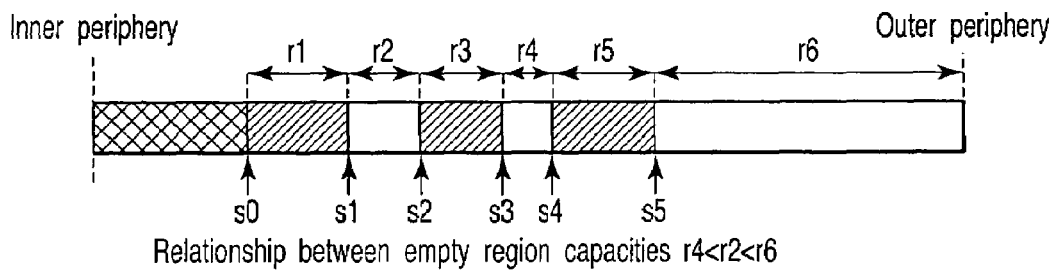
Relationship between empty region capacities r4<r2<r6
FIG. 10
| Recording conditions | Recording destination | |
|---|---|---|
| Reserve recording (Required size (w1)) | w1<r4 | Recording is performed for r4 |
| | r4<w1<r2 | Recording is performed for r2 |
| | r2<w1<r6 | Recording is performed for r6 |
| Direct recording | Recording is performed for r6 | |
FIG. 11

DISK RECORDING DEVICE AND DISK RECORDING METHOD FOR RECORDING AND ERASING TITLES ON A DISK

CROSS-REFERENCE TO RELATED APPLICATIONS

This application is based upon and claims the benefit of priority from prior Japanese Patent Application No. 2003-369309, filed Oct. 29, 2003, the entire contents of which are incorporated herein by reference.

BACKGROUND OF THE INVENTION

1. Field of the Invention

The present invention relates to an improvement of a disk recording device and a disk recording method for recording and erasing titles on, for example, a rewritable optical disk and the like.

2. Description of the Related Art

As is generally known, there have been advances in the technology for high density recording of information, and optical disks having a recording capacity of 4.7 GB (Giga Bytes) for the layer on one surface are put to practical use in recent years.

Examples of this type of optical disk include: DVD-ROM (Digital Versatile Disk-Read Only Memory) for playing-only; rewritable DVD-RAM (Random Access Memory); DVD-RW (Rewritable); and DVD-R (Recordable) on which additional recording can be done, and the like.

However, according to the DVD video specifications, new DVD video titles are always sequentially recorded from the inner periphery side to the outer periphery side of an optical disk so as to be next to the DVD video title that was recorded last. In this case, one DVD video title is recorded in a continuous region on the optical disk and then managed.

In addition, in this type of optical disk, in the case where the last DVD video title that was recorded last is erased, the DVD video title that will be recorded next is overwritten after the DVD video title recorded before the title that was erased, in other words, in the regions where the erased DVD video title was recorded.

Meanwhile, in the case where DVD video titles other than the DVD video title that was recorded last is erased, the region from which the erased title was recorded is not used for recording the new DVD video title, and because this region remains as an empty region, there is a problem that the recording region in the optical disk is not being effectively used.

Jpn. Pat. Appln. KOKAI Publication No. 7-175691 discloses a configuration in which a search is done for the largest continuous empty region of a memory data region and a first cluster is set in the center of the empty region so as to perform data recording, and data recording is thereby performed in continuous clusters, and thus time for recording and playing is shortened.

However, a prerequisite for Jpn. Pat. Appln. KOKAI Publication No. 7-175691 is a recording method in which one group of continuous data is separated into a plurality of clusters and recorded and then managed. According to the specifications for the above-described DVD video, the recording method is such that one title is recorded in a continuous region on the disk and then managed, and there is no disclosure in this publication with respect to effectively using empty regions that are formed discontinuously on the disk as a result of optional erasing of the plurality of titles recorded on the disk.

BRIEF SUMMARY OF THE INVENTION

According to one aspect of the present invention, there is provide a disk recording device comprising: recording sections configured to record titles on a disk based on a management method in which additional recording and erasing of each title is possible, and each of the titles are recorded consecutively in a recording region, and the recorded each title is managed by a manager table which corresponds with the title candidate attached before the finalizing processing is carried out; the start position; and size, and in the case where a recorded title is erased, the region where erasure has been done becomes a recordable empty region and reference to the start position and size from the title candidate of the erased title becomes impossible on the manager table; and a first control section configured to designate the appropriate empty region for recording the title for which reserve recording is requested, from the empty regions present on the disk when the reserve recording of the title on the disk has been requested.

According to another aspect of the present invention, there is provide a disk recording method comprising: a first step of recording a title on the disk based on a management method in which additional recording and erasing of each title is possible, and each of the titles are recorded consecutively in a recording region, and the recorded each title is managed by a manager table which corresponds with the title candidate attached before the finalizing processing is carried out; the start position; and size, and in the case where a recorded title is erased, the region where erasure has been done becomes a recordable empty region and reference to the start position and size from the title candidate of the erased title becomes impossible; and a second step of designating an appropriate empty region for recording the title for which reserve recording is requested, from the empty regions present on the disk when the reserve recording of the title on the disk has been requested.

BRIEF DESCRIPTION OF THE SEVERAL VIEWS OF THE DRAWING

FIG. 1 is a block diagram for describing a disc recording and playing device of an embodiment of this invention;

FIG. 9 describes the manager table after the DVD video title is additionally recorded in the embodiment;

FIG. 10 describes the state in which there are a plurality of empty regions of different sizes present on the optical disk in the embodiment;

FIG. 11 describes the method of designating the recording destination in accordance with the size of the title to be recorded in the embodiment.

DETAILED DESCRIPTION OF THE INVENTION

Figure 2:
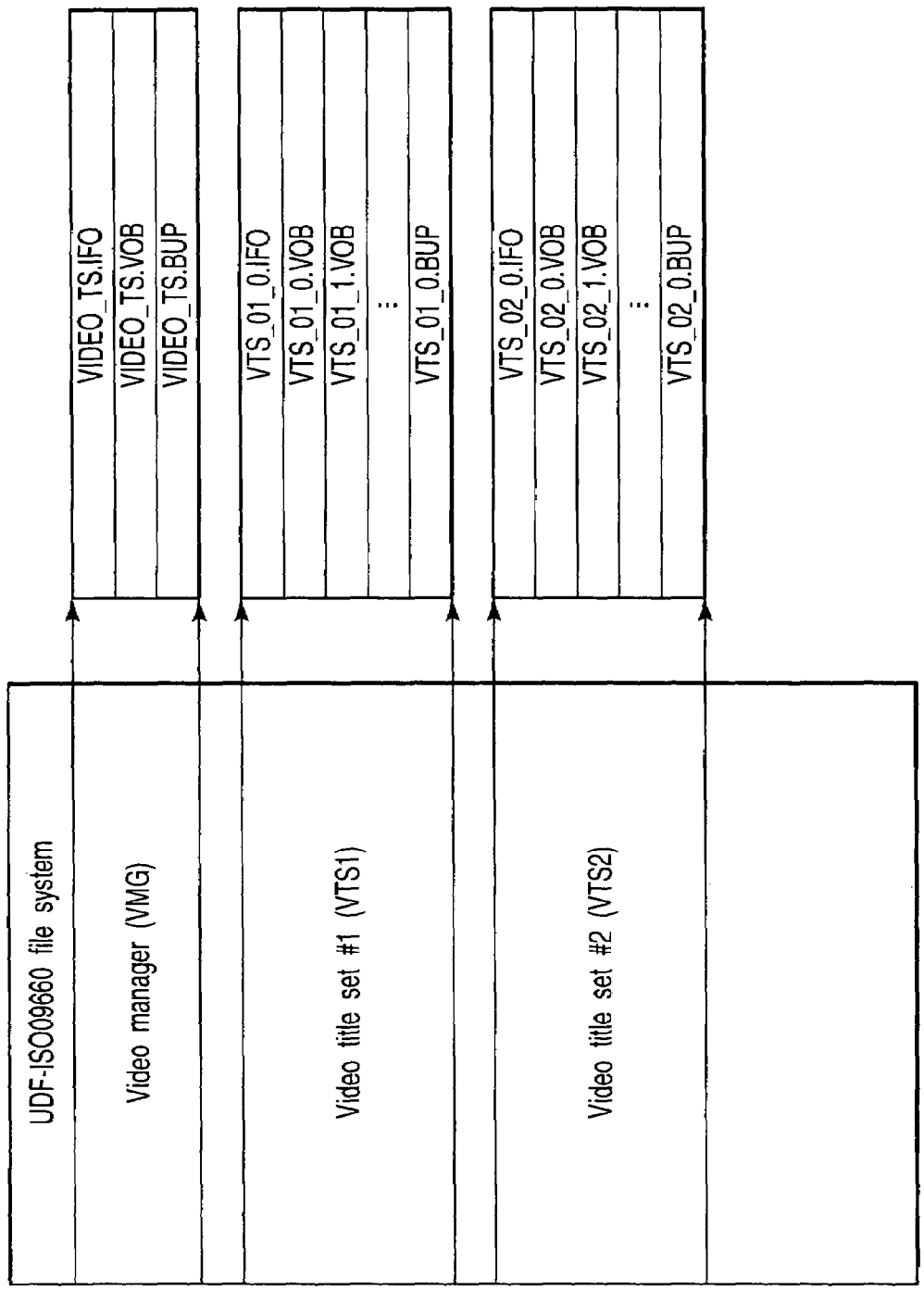
FIG. 2 describes a file configuration of DVD video titles on an optical disk in the embodiment.

An embodiment of this invention will be described with reference to the drawings in the following. FIG. 1 shows a disk recording and playing device described in this embodiment. The disk recording and playing device herein is one that can use both optical disks including DVD-RW and hard disks as the recording medium, but, for example, semiconductor memory and the like may also be used as the recording medium.

In other words, the disk recording and playing device of FIG. 1 is largely divided into the recording side main block at left of the figure, a playing side main block at right of the figure, and a control side main block at lower part of the figure.

In addition, the disk recording and playing device comprises 2 types of disk drive sections. Firstly it comprises a disk drive section 12 which drives and rotates a optical disk 11 which is a first medium and the information recording medium which can build a video file, and reads and writes information. Also, the disk recording and playing device comprises a HDD (Hard Disk Drive) section 13 which drives the hard disk 13a which is a second medium.

A D-PRO (Data-Processor) section 14 can supply recording data to the disk drive section 12 and the HDD section 13 and can also receive the played signals. The disk drive section 12 comprises a rotation control system, a laser drive system and an optical system for the optical disk 11. The D-PRO section 14 handles data for the recording and playing units, and includes a buffer circuit, a modulation/demodulation circuit and an error correction section.

Furthermore, the main elements comprising the disk recording and playing device are: an encoder section 15 which configures the recording side; a decoder section 16 which configures the playing side; and a micro-computer block 17 which controls the operation of the device mainbody.

The encoder section 15 comprises a video and audio analog/digital converter for converting the inputted analog video signal and analog audio signal to digital signals, a video encoder, and an audio encoder. It also includes a sub picture encoder.

The output from the encoder section 15 is converted to a prescribed DVD video format at a formatter 19 which includes buffer memory 18 and is supplied to the D-PRO section 14 described above.

External analog video signal and external analog audio signal obtained from an A/V (Audio Video) input section 20 or analog video signal and analog audio signal obtained from a TV (Television) tuner section 21 are inputted into the encoder section 15.

It is to be noted that when the compressed digital video signal and digital audio signal are input directly, the encoder section 15 can supply the compressed digital video signal and the digital audio signal directly to the formatter 19.

Furthermore, the encoder section 15 can supply the digital video signal and the digital audio signal which has been subjected to analog/digital conversion directly to a V (video) mixing section 22 and an audio selector 23.

The digital video signal is converted to compressed digital video signal at a variable bit rate based on the MPEG (Moving Picture Experts Group) 2 or MPEG 1 specifications at the video encoder which is included in the encoder section 15. The digital audio signal is converted to compressed digital audio signals at a fixed bit rate based on MPEG or AC (Audio Compression)-3 specifications or to linear PCM (Pulse Code Modulation) digital audio signal.

When a sub picture signal is input from the A/V input section 20 (for example, signals from a DVD video player including an independent output terminal for the sub picture signal), or when DVD video signal having such data configuration is broadcast and received at the TV tuner section 21, the sub picture signal of the DVD video signal is encoded at the sub-picture encoder (run length signaling), and this forms the sub picture bit map.

The encoded digital video signal, digital audio signal and sub picture data is packed into the video pack, the audio pack and the sub picture pack at the formatter 19, and the packs are collected and converted to a format specified by the DVD video specifications (for example, the specifications recorded on the DVD-RAM, DVD-RW, DVD-R and the like).

At this point, the disk recording and playing device shown in FIG. 1 supplies the information formatted at the formatter 19 (packs of video, audio and sub picture data and the like) and control information that has been created, to the HDD section 13 or the disk drive section 12 via the D-PRO section 14, and the information can be recorded on the hard disk 13a or the optical disk 11.

The information recorded on the hard disk 13a or the optical disk 11 may be recorded on the optical disk 11 or the hard disk 13a via the D-PRO section 14 and the disk drive section 12.

The microcomputer block 17 includes a MPU (Micro Processing Unit) 17a, a memory section 17b and a timer section 17c and the like. The memory section 17b includes ROM that stores the control programs and the like that the MPU 17a executes, and RAM for supplying the necessary work area for program execution at the MPU 17a. Also the timer section 17c is used for the reserve recording function and the like.

Execution results of the microcomputer block 17 which must be informed to the user may be displayed at the built-in display section 24 of the disk recording and playing device or by OSD (On Screen Display) at the externally connected monitor display 25. Furthermore, the microcomputer block 17 has a key input section 26 for giving the operation signals for operating the device.

It is to be noted that the timing for the micro-computer block 17 to control the disk drive section 12, the HDD section 13, the D-PRO section 14, the encoder section 15 and the decoder section 16 and the like can be set based on the time data from the STC (System Time Clock) 27. The recording and playing operations are usually performed so as to synchronize with the time clock from STC 27, but the other processes may be performed with a timing that is independent of the time clock from STC 27.

The decoder section 16 comprises: a separator for separating and fetching each packs from the signals of the DVD video format that has pack configuration; memory used at the time pack separation and when other signal processing is performed; a V decoder for decoding the main picture data separated at the separator (contents of the video pack); a SP (Sub Picture) decoder for decoding the sub picture data separated at the separator (contents of the sub picture pack); and an A (Audio) decoder for decoding the audio data separated at the separator (contents of the audio pack). Furthermore, the decoder section 16 comprises a video processor wherein the decoded main picture is appropriately synthesized with the decoded sub picture, and the main picture and sub pictures such as a menu, a highlight button, captions and the like are combined and output.

The output video signal of the decoder section 16 is input to the V mixing section 22. Synthesis of text data is performed at the V mixing section 22. Furthermore, the line which directly fetches signals from the TV tuner 21 or the A/V input section 20 is also connected to the V mixing section 22.

A frame memory section 28 which is used as a buffer is connected to the V mixing section 22. When the output from the V mixing section 22 is analog output, it is output via the I/F (Interface) 29 to the outside, and when the output is digital, it is output via the D/A (Digital/Analog) converter 30 to the external monitor display 25.

The output audio signal of the decoder section 16 is converted to analog at the D/A converter 31 via the selector 23 and output to the externally connected speaker 32. The selector 23 is controlled by select signals from the microcomputer block 17. As a result, when the selector 23 directly monitors the digital signal from A/V input section 20 or the TV tuner section 21, the signal that has passed through the encoder section 15 can be selected directly.

FIG. 2 shows the file system (UDF (Universal Disk Format)-ISO (International Organization for Standardization) 9660) of the optical disk 11 in accordance with DVD video specifications and the arrangement of the DVD video titles.

The video manager (VMG (Video Manager)) comprises a navigation file (.IFO and .BUP) for managing play control information of the entire optical disk 11 and a presentation file (.VOB) which comprises picture/voice/caption data which form the menu (VMG menu) for selecting a unique DVD video title recorded on the optical disk 11.

On the other hand, the video title set (VTS (Video Title Set)) comprises a navigation file (.IFO and .BUP) for managing play control information of a title unit and a presentation file (.VOB) which comprises picture/voice/caption data which configures the menu for each video title set (VTS menu) and the title.

Using the VTS1 as an example, the VTS_01_0.VOB file forms the VTS menu (VTSM) of VTS1, and VTS_01_1.VOB to VTS_01_9.VOB are the files that form the VTS1, and the number of files that form the video title set depends on the size of the title.

The size of 1 file cannot exceed 1 GB (Giga Byte) because of the limits of the UDF bridge file system. Also, the presentation files which form the VTS must be consecutively physically recorded on the optical disk 11. Furthermore, both in the VMG and VTS, a relative positional relationship between the navigation file and the presentation file must be kept.

Figures 3, 4:
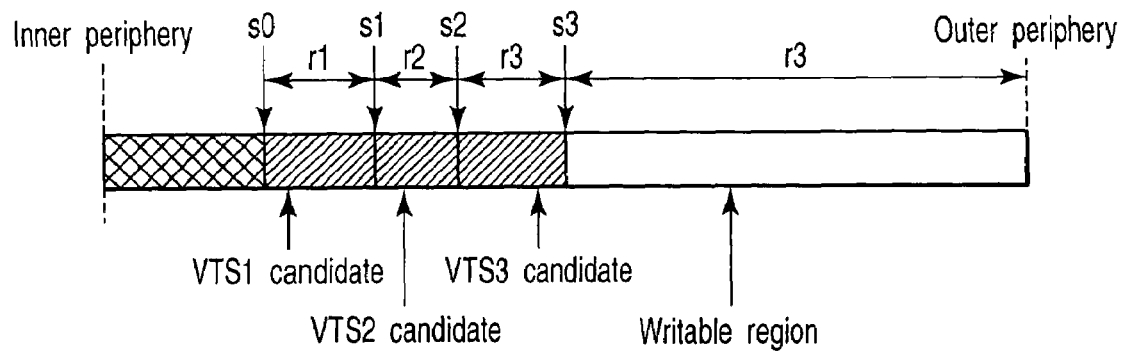
FIG. 3 describes the state in which a plurality of DVD video titles is recorded on the optical disk in the embodiment.
FIG. 4 describes an example of a manager table for the DVD video titles recorded on the optical disk in the embodiment.

FIG. 3 shows the state in which a plurality (3 in this case) of the DVD video titles VTS1 to VTS3 are recorded on the optical disk 11. The plurality of DVD video titles VTS1 to VTS3 do not have to be consecutively recorded, but normally they are recorded consecutively from the inner periphery side to the outer periphery side of the optical disk 11.

The title number that is specified by the DVD video specifications is not set until the finalizing processing (processing to make the optical disk 11 playable) has been carried out. For this reason, the recorded DVD video titles VTS1 to VTS3 are managed as title candidates (VTS candidates) until the finalizing processing has been carried out. In other words, the recorded DVD video titles VTS1 to VTS3 are managed as VTS1 to VTS3 candidates that are assigned consecutive numbers from the inner periphery side to the outer periphery side of the optical disk 11.

FIG. 4 is an example of the title manager table. That is to say, because adding and erasing of the DVD video titles is possible until the finalizing processing has been carried out, recording of the file system is not performed. Because of this, the table for provisionally managing the DVD video titles must be written on the optical disk 11, but this manager table uses a set independent format for each maker.

The recording destination is at a fixed position in the optical disk 11, or it may be managed by title unit. Various types of information are recorded in the manager table in accordance with need, but each title candidate entry is recorded therein. The entry is information for referring to the file (data), and includes start address, file size and the like. Also, in order to facilitate management of the manager table, a reference table for making indirect reference possible is provided.

Figure 5:
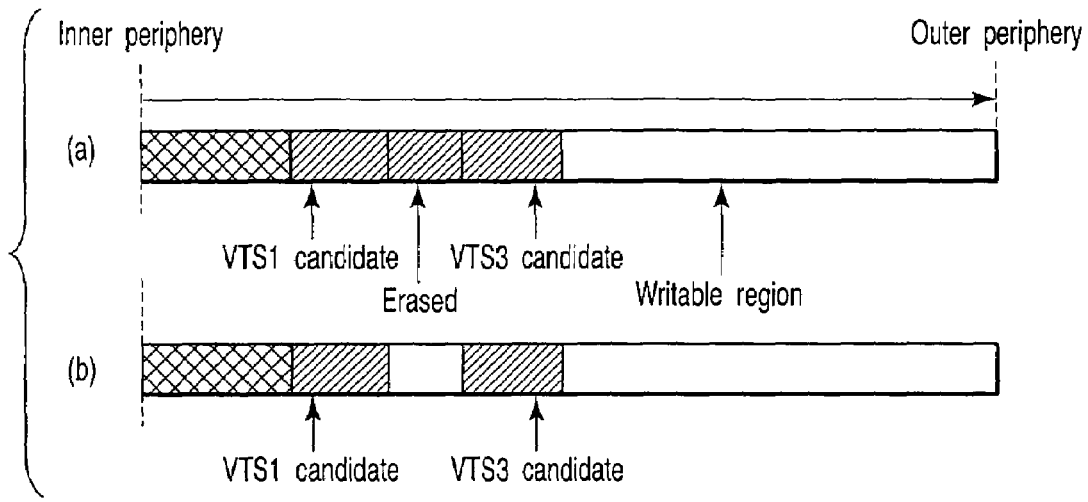
FIG. 5 describes the state in which a optionally selected DVD video title is erased from the optical disk in the embodiment.

FIG. 5 shows the state in which an optional recorded DVD video title (VTS2) is erased from the optical disk 11. When the DVD video title is to be erased, not only the specific navigation file in the title or the presentation file is erased, but rather all the files forming the title are erased.

Normally, erasure is not erasing the data recorded on the optical disk 11, and can be done by the references being removed from the reference table to the manager table. That is to say, in the embodiment shown in FIG. 5, after the DVD video title (VTS2) is erased, the VTS2 candidate in the reference table refers to the DVD video title (VTS3) which is the VTS3 candidate in the original reference table.

Figure 6:
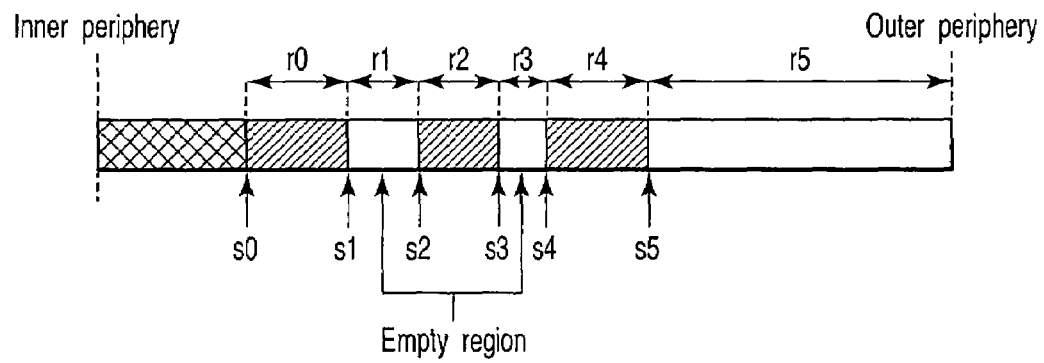
FIG. 6 describes the position of the titles in the optical disk when the recording and erasing of the DVD video titles are performed repeatedly in the embodiment.

FIG. 6 shows the effective data arrangement in an optical disk 11 after DVD video title recording and erasing have been carried out repeatedly. In the case where the DVD video title that was last recorded on the optical disk 11 is being erased, the front of the erased title is set as the recording destination for the DVD video title that will be recorded next on the optical disk 11.

In addition, when there are a plurality of DVD video titles that have been recorded, and titles other than the DVD video title that was recorded last are to be erased, valid data (titles that have not been erased) will be present in a discontinuous manner on the optical disk 11. From the opposite perspective, it can be said that, there are discontinuous usable empty regions on the optical disk 11.

Figure 7:
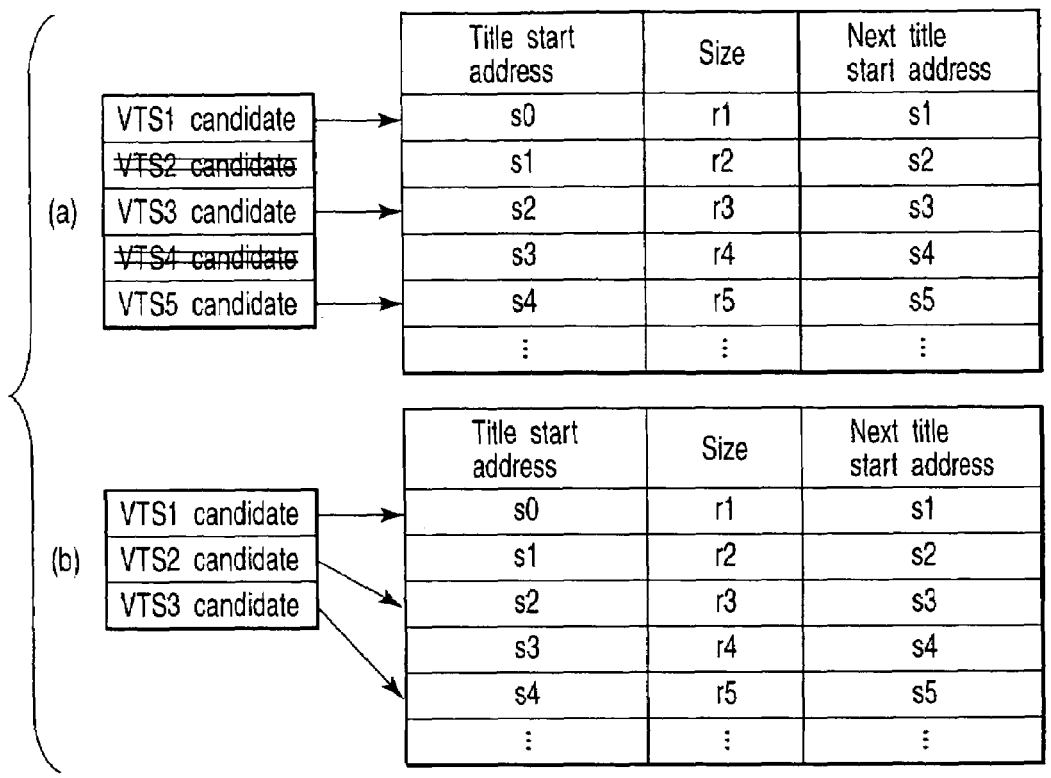
FIG. 7 describes the manager table and the reference table in the case where a optionally selected DVD video title is erased from the optical disk in the embodiment.

FIG. 7 shows the manager table and the reference table in the case where an optional title is erased from among the plurality of DVD video titles recorded on the optical disk 11. The reference table is rewritten from the top such that only reference candidates to the effective manager table remain. In addition, by searching for the title candidate that is being referred to at the reference table in the manager table, the position and size of the discontinuous empty region formed on the optical disk 11 can be determined and management of recording destination becomes possible.

Figure 8:
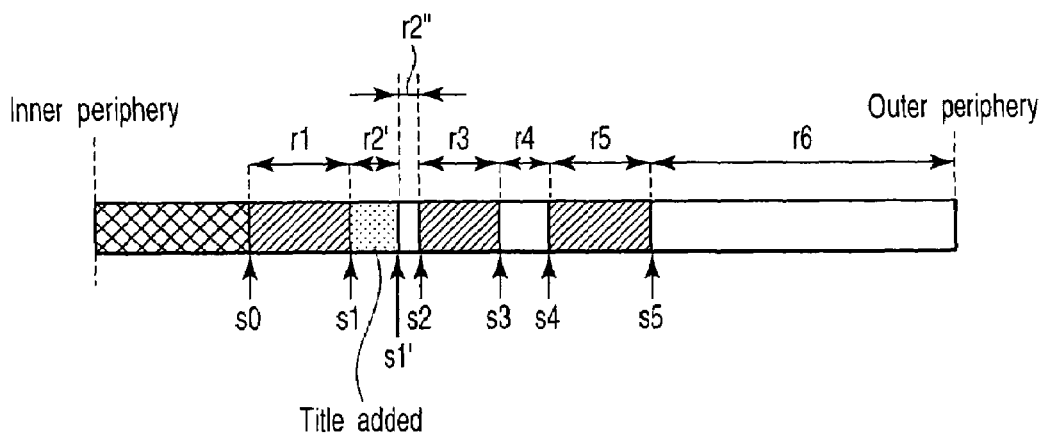
FIG. 8 describes the state in which a DVD video title is additionally recorded in a prescribed empty region present on the optical disk in the embodiment.

FIG. 8 shows the state in which a DVD video title is additionally recorded in a prescribed empty region on the optical disk 11. In order to set the destination for recording, the conditions at the time of recording and size of the empty region capacity must be compared and then a determination must be made as to whether or not writing is possible.

FIG. 9 shows the manager table after the DVD video title is additionally recorded. The title entries are used from the entry near the top in the manager table which the erased title used. According to specification, a maximum of 99 DVD video titles (VTS) can be stored in the optical disk 11 and thus 99 title entries can be managed inside the manager table.

If as shown in FIG. 10 for example, there are 3 empty regions on the optical disk 11, and the relationship of the size of each empty regions is such that r4<r2<r6. In this case, when the necessary region size for title recording is determined in advance based on picture quality, sound quality and recording time as in the case of reserved recording, or when the recording conditions are not known as in the case of direct recording, the recording destination is changed as shown in FIG. 11.

That is to say, in the reserved recording, in the case where the size of the region required for recording the title is w1, w1 and r4 are compared and if w1<r4, the title is recorded in the empty region of size r4. Also, w1, r4 and r2 are compared, and if r4<w1<r2, the title is recorded in the empty region of size r2. Furthermore, when w1, r2 and r6 are compared, if r2<w1<r6, the title is recorded in the empty region of size r6.

If the required region size for recording the title is not known in advance as in the case of direct recording, recording is controlled so as to be carried out in the empty region having the largest size r6 in the optical disk 11.

Figure 12:
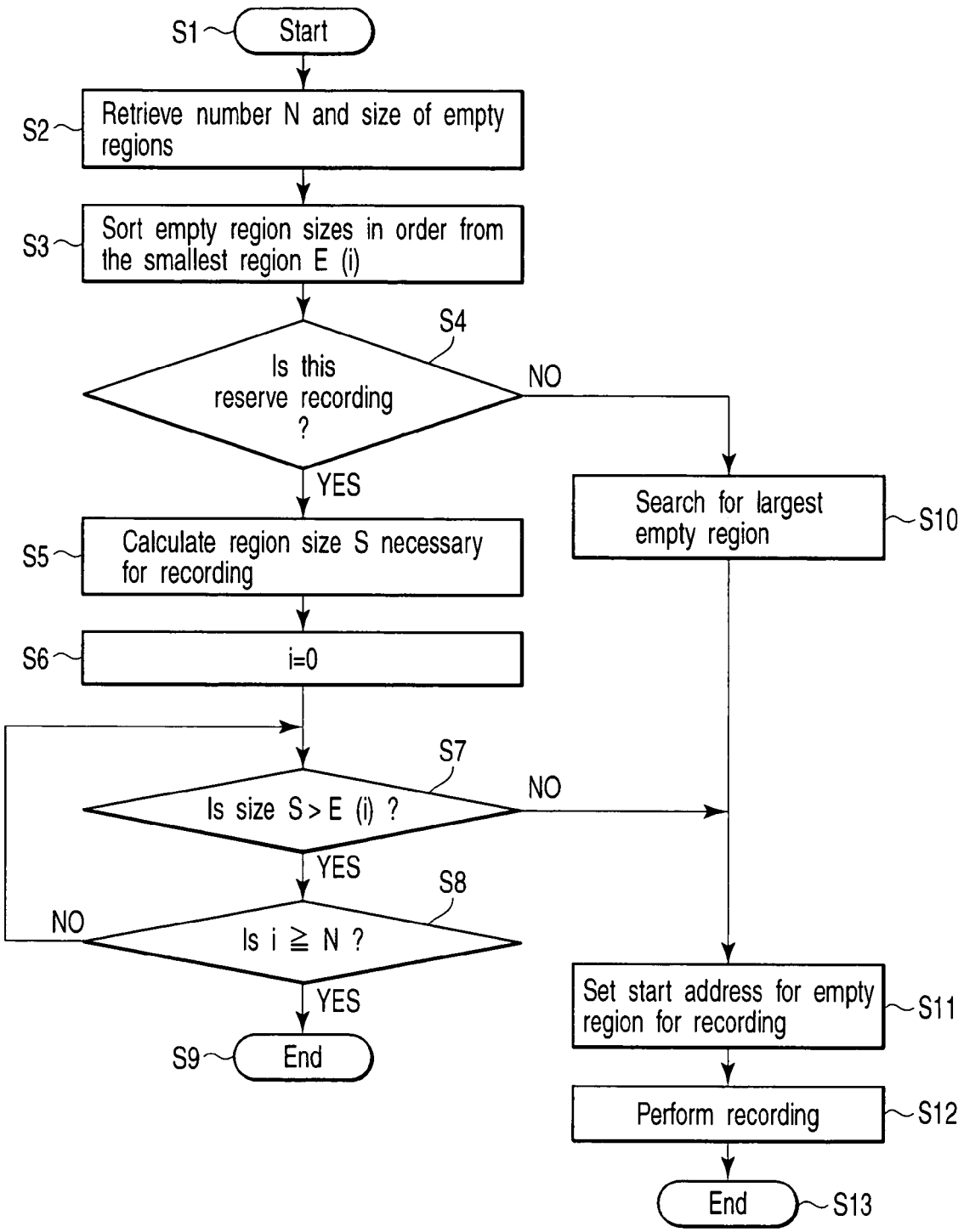
FIG. 12 is a flowchart for describing the operation of designating the recording destination in accordance with the size of the title to be recorded in the embodiment.

FIG. 12 is a flowchart showing the operations for designating the empty region where the title will be recorded on the optical disk 11 in accordance with the region size required for recording the title as described above.

First, when processing begins (Step S1) as a result of a request for a DVD video title to be recorded on the optical disk 11, in Step S2, the microcomputer block 17 obtains information showing the number of empty region N on the optical disk 11 and the sizes thereof from the manager table recorded on the optical disk 11.

In addition, in Step S3, the microcomputer block 17 creates a table in which the empty regions on the optical disk 11 are sorted in order from the region E with the smallest size (0) to the region E with the largest size (i), and in Step S4, a determination is made as to whether or not the DVD video title is to be recorded by reserve recording.

If it is determined that the DVD video title is to be recorded by reserve recording (YES), the microcomputer block 17 calculates the region size S necessary for recording the DVD video title in Step S5, and the number i which is assigned in decreasing order of the size of the empty region on the optical disk 11 is set to 0 in Step S6.

Subsequently, in Step 7, the microcomputer block 17 determines whether or not the necessary region size S exceeds the size of the empty region E (i), and in the case where it is determined that this size is exceeded (YES), a determination is made in Step S8 as to whether or not the number i is greater than the number N of empty regions in optical disk 11.

In addition, if it is determined that the number i is not greater than the number N of empty regions on the optical disk 11 (NO), the microcomputer block 17 increases i by 1 and moves to the process of Step S7, and if it is determined that the number i is greater than the number N of empty regions on the optical disk 11 (YES), the process ends (Step S9).

If it is determined in Step S4 above that the DVD video title is not to be recorded by reserve recording (NO), the microcomputer block 17 searches for the largest size empty region on the optical disk 11 in Step S10.

After Step S10, or if it determined in Step S7 above that the necessary region size S does not exceed the size of the empty region E (i) (NO), the microcomputer block 17 sets the empty region for recording in Step 11, and the start address of the empty region is set, and in Step S12, recording of the DVD video title is performed, and the process ends (Step 13).

According to the above-described embodiment, in the case of reserve recording, the size necessary for recording is calculated and the region for most effective recording is set from among the empty regions as the recording destination, and the case of direct recording the empty region with the largest size is set as the recording destination. Thus in the method in which one DVD video title is recorded in a continuous region on the optical disk 11 and then managed, the recording capacity of the optical disk 11 is effectively used.

It is to be noted that the present invention is not to be limited by the above-described embodiment, and various modifications to the structural elements may be made within the scope of the invention at the stage where the invention is actually implemented. Furthermore by appropriately combining the plurality of structural elements disclosed in this embodiment, various inventions may be created. For example, some structural elements may be eliminated from among the all structural elements disclosed in this embodiment. Furthermore structural elements of different embodiments may be combined.

What is claimed is:

1. A disk recording device comprising:

recording sections configured to record titles on a disk based on a management method in which additional recording and erasing of each title is possible, and each of the titles is recorded consecutively in a recording region, and the recorded each title is managed by a manager table which corresponds with a title candidate attached before a finalizing processing is carried out; a start position; and size, and in a case where a recorded title is erased, a region where erasure has been done becomes a recordable empty region and reference to the start position and size from the title candidate of the erased title becomes impossible on the manager table; and a first control section configured to designate an appropriate empty region for recording the title for which reserve recording is requested, from empty regions present on the disk when the reserve recording of the title on the disk has been requested, the first control section comprising:

a retrieval section configured to retrieve information showing the start position and size of all recordable empty regions present on the disk from the disk;

a calculation section configured to calculate the size of the necessary recording region size based on recording conditions for the title, when reserve recording of the title has been requested for the disk; and a designation section configured to designate the empty region for recording the title for which the reserve recording is requested, by comparing the size calculated at the calculation section with the size of the empty region retrieved at the retrieval section, wherein the designation section designates the empty region with the smallest size of the empty regions with a size that is larger than the size calculated at the calculation section from among the empty regions present on the disk; and a second control section configured to designate the empty region with the largest size retrieved at the retrieval section as the recording destination of the title for which direct recording is requested, when direct recording of the title has been requested for the disk.

2. A disk recording device according to claim 1, wherein the designation section sequentially compares the size calculated at the calculation section starting with the region with the smallest size from among the empty regions obtained at the retrieval section, and designates the empty regions with a size greater than the size first calculated at the calculation section.

3. A disk recording device according to claim 1, wherein the management method is a DVD video specification.

4. A disk recording method comprising:

a first step of recording a title on a disk based on a management method in which additional recording and erasing of each title is possible, and each title is recorded consecutively in a recording region, and the recorded each title is managed by a manager table which corresponds with a title candidate attached before a finalizing processing is carried out; a start position; and size, and in a case where a recorded title is erased, a region where erasure has been done becomes a recordable empty region and reference to the start position and size from the title candidate of the erased title becomes impossible;

a second step of designating an appropriate empty region for recording the title for which reserve recording is requested, from empty regions present on the disk when the reserve recording of the title on the disk has been requested, the second step comprising:

retrieving information showing the start position and size of all recordable empty regions present on the disk from the disk;

calculating the size of the necessary recording region based on the recording conditions for the title when reserve recording of the title has been requested for the disk; and comparing the calculated size with the retrieved size of the empty region and designating the empty region for recording the title for which the reserve recording is requested, said designating comprising:

designating the empty region with the smallest size of those empty regions with a size larger than the calculated size from among the empty regions present on the disk; and a third step of designating the retrieved empty region with the largest size as the recording destination of the title for which direct recording is requested, when direct recording of the title has been requested for the disk.

5. A disk recording method according claim 4, wherein the designating the empty region for recording the title for which reserve recording is requested comprises:

sequentially comparing the calculated size starting with the region with the smallest size from among the retrieved empty region sizes; and designating the empty regions larger in size than the size first calculated from among the sizes of the empty regions.

6. A disk recording method according to claim 4, wherein the management method is a DVD video specification.

* * * * *